US006967924B1

(12) United States Patent
Aimoto

(10) Patent No.: US 6,967,924 B1
(45) Date of Patent: Nov. 22, 2005

(54) PACKET SWITCHING DEVICE AND CELL TRANSFER CONTROL METHOD

(75) Inventor: Takeshi Aimoto, Sagamihara (JP)

(73) Assignee: Hitachi, Ltd., Tokyo (JP)

(*) Notice: Subject to any disclaimer, the term of this patent is extended or adjusted under 35 U.S.C. 154(b) by 0 days.

(21) Appl. No.: 09/503,110

(22) Filed: Feb. 14, 2000

Related U.S. Application Data

(63) Continuation of application No. 08/788,416, filed on Jan. 27, 1997, now Pat. No. 6,041,038.

(30) Foreign Application Priority Data

Jan. 29, 1996 (JP) .................................. 8-012514

(51) Int. Cl.[7] ............................................. H04L 12/26

(52) U.S. Cl. ................................... 370/235; 370/395.1

(58) Field of Search ............................ 370/230, 230.1, 370/231, 232, 235, 235.1, 395.1, 395.2, 395.21, 370/395.42, 395.43, 229

(56) References Cited

U.S. PATENT DOCUMENTS

| | | | | |
|---|---|---|---|---|
| 5,090,011 A | | 2/1992 | Fukuta et al. | 370/230 |
| 5,267,232 A | | 11/1993 | Katsube et al. | 370/230 |
| 5,555,265 A | * | 9/1996 | Kakuma et al. | 370/395.43 |
| 5,583,858 A | * | 12/1996 | Hanaoka | 370/392 |
| 5,764,641 A | | 6/1998 | Lin | 370/412 |

* cited by examiner

*Primary Examiner*—Chi Pham
*Assistant Examiner*—Anh-Vu Ly
(74) *Attorney, Agent, or Firm*—Mattingly, Stanger, Malur & Brundidge, P.C.

(57) ABSTRACT

For setting up a connection belonging to a particular traffic class which does not make bandwidth reservation, information indicative of a priority related to cell discard declared by a source unit is stored in either of nodes in an ATM network corresponding to an identifier of the connection, such that the node selectively performs discard processing on cells belonging to the particular traffic class, when congestion occurs on the connection, in conformity to a predetermined discard condition determined by a relationship between the status of the congestion and the priority. In this way, traffics can be protected for connections having higher priorities even if they do not make bandwidth reservation.

4 Claims, 4 Drawing Sheets

CELL FORMAT
FROM 162
DATA
PTY
INPUT VCI
TO 132
210
212
214
216

INTERNAL CELL FORMAT
FROM 132
DATA
PTY
OUTPUT VCI
OUTPUT PORT
TRAFFIC CLASS
TRAFFIC SUB-CLASS
PACKET UNDER DISCARD
TO 134,136
220
212
214
221
222
224
225
228

CONNECTION INFORMATION AT CALL SETUP
FROM 162
DESTINATION ADDRESS
TRAFFIC CLASS
TRAFFIC SUB-CLASS
TERMINAL PROTOCOL
TO 100,164
230
232
234
236
238

PACKET SWITCHING DEVICE AND CELL TRANSFER CONTROL METHOD

This is a continuation of application Ser. No. 08/788,416, filed Jan. 27, 1997, which was allowed on Nov. 2, 1999, now U.S. Pat. No. 6,041,038.

BACKGROUND OF THE INVENTION

1. Field of the Invention

The present invention relates to a packet switching device and a fixed length packet transfer control method, and more particularly to an ATM (Asynchronous Transfer Mode) packet switching device having a congestion control function and a cell transfer control method in an ATM network.

2. Description of the Related Art

The transfer of fixed length packets (hereinafter referred to as a "cell") is described, for example, in "Data Communication Using ATM: Architectures, Protocols, and Resource Management", IEEE Communication Magazine, August 1994, p 24–33 and "SVC Signaling: Calling All Nodes", DATA COMMUNICATIONS, June 1995, p 123–128, and so on.

In an ATM network, a call (connection) is set up by signaling processing performed upon initiating the call along a communication path from a transmitting device (source terminal) to a receiving device (destination terminal) through a switching device (switch) serving as a transfer path of user cells, and the transfer of the user cells is controlled based on connection identification information attached to a header portion of each user cell.

A call setup procedure is described, for example, in ITU-T Standard Q.2931, and the call setup procedure is executed to set connection information to a transmitting device, each node (switch) on a path, and a receiving device. The connection information includes identifiers for identifying a call on each of links between the transmitting device and a switch, between switches, and between a switch and the receiving device, a traffic class indicative of a priority of cell transfer in a switch, and so on. The identifiers for identifying a connection (call) are referred to as "VPI" (Virtual Pass Identifier) and "VCI" (Virtual Connection Identifier) and set in a header portion of each cell as address information.

Each switch searches for connection information necessary for the switching operation based on VPI and VCI in each of input cells received through a transmission path. The connection information includes, for example, internal routing information (output port number), identifiers to be attached to an output cell (output VPI/VCI), a traffic class indicative of a cell priority in the switch, and so on.

The traffic class indicative of a cell priority is described, for example, in "Multimedia Traffic Management Principles for Guaranteed ATM Network Performance", IEEE JOURNAL ON SELECTED AREAS IN COMMUNICATIONS, Vol. 8, No. 3, April 1990, p 437–446, and "Traffic Management for B-ISDN Services" IEEE Network, September 1992, p 10–19.

The traffic class indicative of a cell priority includes two: CBR (Constant Bit Rate) and VBR (Variable Bit Rate). CBR is a traffic class in which a predetermined cell transfer rate is contracted between a network and a terminal upon setting up a call so that the network side guarantees the cell transfer at the contracted transfer rate. VBR is a traffic class which tolerates a certain degree of statistical variations for a transfer rate contracted with a terminal. The scheme which controls traffic with a contract previously made between a network and a terminal is referred to as "preventive control".

As traffic for transmitting cells utilizing a remaining portion of a bandwidth allocated to another terminal in the above-mentioned CBR and VBR without making a special contract related to the transfer rate between a network and a terminal upon setting up a call, there is a group of traffic classes referred to as "best effort control". The transfer rate contract is not made primarily because it is difficult for a terminal outputting burst traffic to predict the characteristic of the traffic upon setting up a call.

The group of best effort control traffics includes a UBR (Unspecified Bit Rate) traffic class in which a network does not guarantee anything with respect to cell transfer, and an ABR (Available Bit Rate) traffic class which performs a feedback control between a network and a terminal during congestion to guarantee the prevention of cell loss. The ABR traffic class is described, for example, in "Rate-Based Flow Control Framework for the Available Bit Rate ATM Service", IEEE Network, March/April 1995, p 25–39.

A configuration of a switch for controlling a transfer in accordance with a traffic class is described, for example, in JP-A-6-197128. In a packet switching scheme described in this publication, each output port is provided with two output buffers, one for CBR traffic class and the other for VBR traffic class, and information indicative of an empty/full state of the two buffers are stored as table information corresponding to each output port, such that an input buffer control unit references the table information to determine a buffer for accumulating cells destined to each output port.

In this case, the output priority of cells accumulated in CBR buffer is ranked higher than that of the VBR buffer so that a communication delay time in a switch can be limited within a predetermined value for a group of cells of the CVR traffic which has strict restrictions to communication delay. In addition, if the CBR buffer does not have any free space, for example, cells may be accumulated in the VBR buffer, provided that it has some free space, to make good use of a bandwidth in the switch. Further, for supporting the ABR and UBR traffic classes, an output buffer supporting further traffic classes may be additionally provided in addition to the CBR and VBR traffic classes.

As described above, while several traffic classes have already been proposed in asynchronous communication, it is desired to perform a transfer control by further fractionizing the characteristics in each traffic class, in addition to controlling how a plurality of these traffic classes are properly used.

However, taking as an example the UBR traffic classes which do not give special guarantee to a cell transfer, when a network falls into congestion, a conventional system does not have any means for controlling the Quality of Service belonging to these traffic classes.

SUMMARY OF THE INVENTION

It is an object of the present invention to provide a packet processing apparatus and an ATM cell transfer control method which can control the Quality of Service when congestion occurs for a group of best effort control traffic classes which do not make a contract with respect to a transfer rate between a network and a terminal upon setting up a call.

It is another object of the present invention to provide a node such as an ATM switching device and an ATM cell transfer control method which can control selective cell discard when congestion occurs for a group of traffic classes which have difficulties in making bandwidth reservation from a terminal device upon setting up a call.

To achieve the above objects, a cell transfer control method of the present invention storing information indicative of a priority related to cell discard declared from a source unit in any of nodes in the network corresponding to an identifier of the connection, when setting up a connection belonging to a particular traffic class which does not make bandwidth reservation, such that, when congestion occurs on the connection, the node performs selective discard processing on cells belonging to the particular traffic class in conformity to a predetermined discard condition determined by a relationship between the status of the congestion and the priority.

The node stepwisely changes a cell discard priority class, for example, in accordance with the congestion status, and determines whether or not each cell belonging to the particular traffic class is discarded in conformity to a predetermined discard condition determined by the priority and the cell discard priority class.

In this case, the node may judge whether nor not a data block included in a data portion of each cell of the particular traffic class is divided from the same transmission message as a data portion of a previous cell, and perform the discard processing on cells falling under the discard condition in units of transmission message.

As for the cell discard in units of message, the discard processing is started on cells which fall under a predetermined discard condition determined, for example, by a relationship between the congestion status and the priority, and the discard processing is continued on subsequent cells including part of the same transmission message as data portions of already discarded cells, even if the subsequent cells deviate from the discard condition due to a change in the congestion status. As a modification to the cell discard in units of message, for example, cells including data blocks of the same transmission message as data portions of previously sent cells may be excluded from cells to be discarded, within cells falling under the discard condition, and the discard processing may be started from a cell including a head data block of a subsequent new message.

Also, the present invention provides a packet switching device connected to a plurality of input lines and to a plurality of output lines for transferring each fixed length packet (cell) inputted from each input line to any output line determined by cell header information, which is characterized by comprising means, operative when setting up a connection belonging to a particular traffic class which does not make bandwidth reservation, for storing information indicative of a priority related to cell discard declared from a calling unit as sub-class information corresponding to an identifier of the connection, means for detecting a congestion status on each of the output lines, and means for selectively performing discard processing on a cell belonging to the particular traffic class in conformity to a predetermined discard condition determined by a relationship between a congestion status on an output line, to which the cell is to be transferred, and the priority.

More specifically, the packet switching device of the present invention comprises switch means having a plurality of input ports and a plurality of output ports for transferring a fixed length packet (cell) inputted from each input port to any output port determined by cell header information, input line interfaces each connected between one of the input ports and an input line, output line interfaces each connected between one of the output ports and an output line, a call control unit connected to the switch means and each of the input line interfaces for transmitting and receiving a call control cell to and from the switch means and for transmitting control information including header rewrite information to each of the input interfaces, and congestion monitor means for detecting a congestion status of output cells on each of the output ports and notifying each of the input interfaces of a detected congestion status as congestion status information, and is characterized in that the call control unit includes means, operative when setting a connection belonging to a particular traffic class which does not make bandwidth reservation, for notifying an input interface accommodating a calling unit, which is a requestor of the connection setup, of identification information on the connection and control information including traffic class information declared by a control message from the calling unit and sub-class information indicative of a priority related to cell discard, and each of the input interfaces includes cell discard control means for selectively discarding user cells belonging to the particular traffic class received from each input line after the connection is set up, in conformity to a predetermined discard condition determined by a congestion status at a destination output port of the user cell revealed from the congestion status information and the priority related to cell discard notified from the call control unit.

Each of the input line interfaces includes header conversion means for rewriting header information of an input cell from each input line, and input buffer means for temporarily accumulating head converted cells, and the cell discard control means selectively accumulates input cells belonging to the particular traffic class in the input buffer means in conformity to the discard condition.

Also, the switch means includes output buffer means corresponding to the each output port, and means for distributing each of user cells having a head converted by the each input line interface to either of the output buffer means specified by header information, and the congestion monitor means detects a congestion status of the output cell from an accumulation situation of user cells in the each output buffer means. In addition, the switch means may include a plurality of output buffer means for each output port so as to allocate one of the output buffer means to cells of a CBR traffic class which guarantees a transfer rate.

According to the configuration of the present invention, the priority information related to cell discard has been previously defined as a sub-class for a traffic class which does not make bandwidth reservation such as the aforementioned best effort control traffic class group. Upon setting up a call, a source terminal notifies a network of the priority such that cells of the connection having the lowest priority are first discarded in conformity to the priority information specified by the sub-class, when a best effort control traffic class falls into congestion, to exclude cells of connections having higher priorities from cells to be discarded even if the cells belong to the same traffic class. When the degree of congestion becomes more grave even though cells have been discarded, the cell discard is gradually performed on cells of connections having higher priorities. However, as the best effort traffic class is recovered from the congestion, the discard processing is stopped in order from cells of connections having higher priorities. In this way, the Quality of Service can be guaranteed for connections having higher priorities even within the best effort control traffic class group.

The foregoing and other objects, advantages, manner of operation and novel features of the present invention will be understood from the following detailed description when read in connection with the accompanying drawings.

DESCRIPTION OF THE PREFERRED EMBODIMENTS

An ATM switching device comprising FIFO output buffers for controlling cell transfer with the CBR traffic class treated as a traffic having a higher priority will be described as an embodiment of the present invention.

Figure 1:
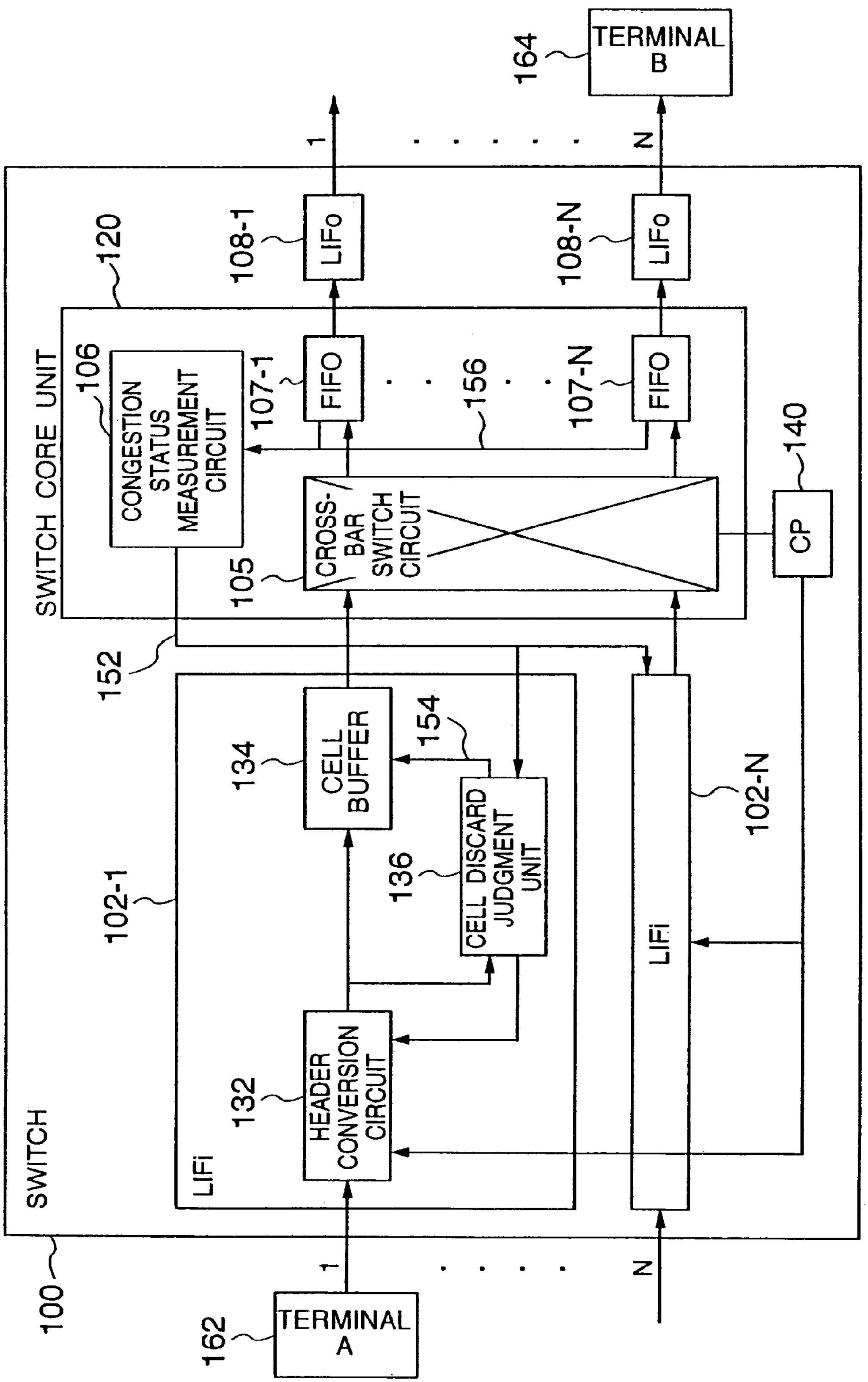
FIG. 1 is a block diagram illustrating an embodiment of a packet switching device 100 according to the present invention.

FIG. 1 illustrates an ATM switching device (switch) 100 according to the present invention which is connected to N input lines and N output lines.

While a network configuration including two terminal devices A and B 162, 164 connected to the switching device through input/output lines (subscriber lines) is illustrated for convenience of explanation, a portion of the input/output cables may be a trunk for connecting the switching device to another switching device. Also, in this example, the configuration is illustrated such that the terminal A 162, located on the left side of the switch 100, transfers cells to the terminal B 164 located on the right side of the switch 100. However, in an actual switching device, an ith input line forms a pair with an ith output line, and an output cell from the first output line in FIG. 1 is inputted to the terminal A, while a transferred cell from the terminal B is inputted to an Nth input line.

The switch 100 is composed of a plurality of input line interface units (LIFi) 102 (102-1~102-N) disposed corresponding to the respective input lines, a switch core unit 120, a plurality of output line interface units (LIFO) 108 (108-1~108-N) disposed corresponding to the respective output lines, and a call control unit (connection processing unit: CP) 140.

Each of the input line interface units 102 is composed of a header conversion circuit 132, a cell discard judgement unit 136, and a cell buffer 134. Also, the switch core unit 120 is composed of a crossbar switch circuit 105, a plurality of FIFOs 107 (107-1~107-N) provided corresponding to respective output lines, and a congestion status measurement circuit 106 connected to the respective FIFOs 107.

Figures 2A, 2B, 2C:
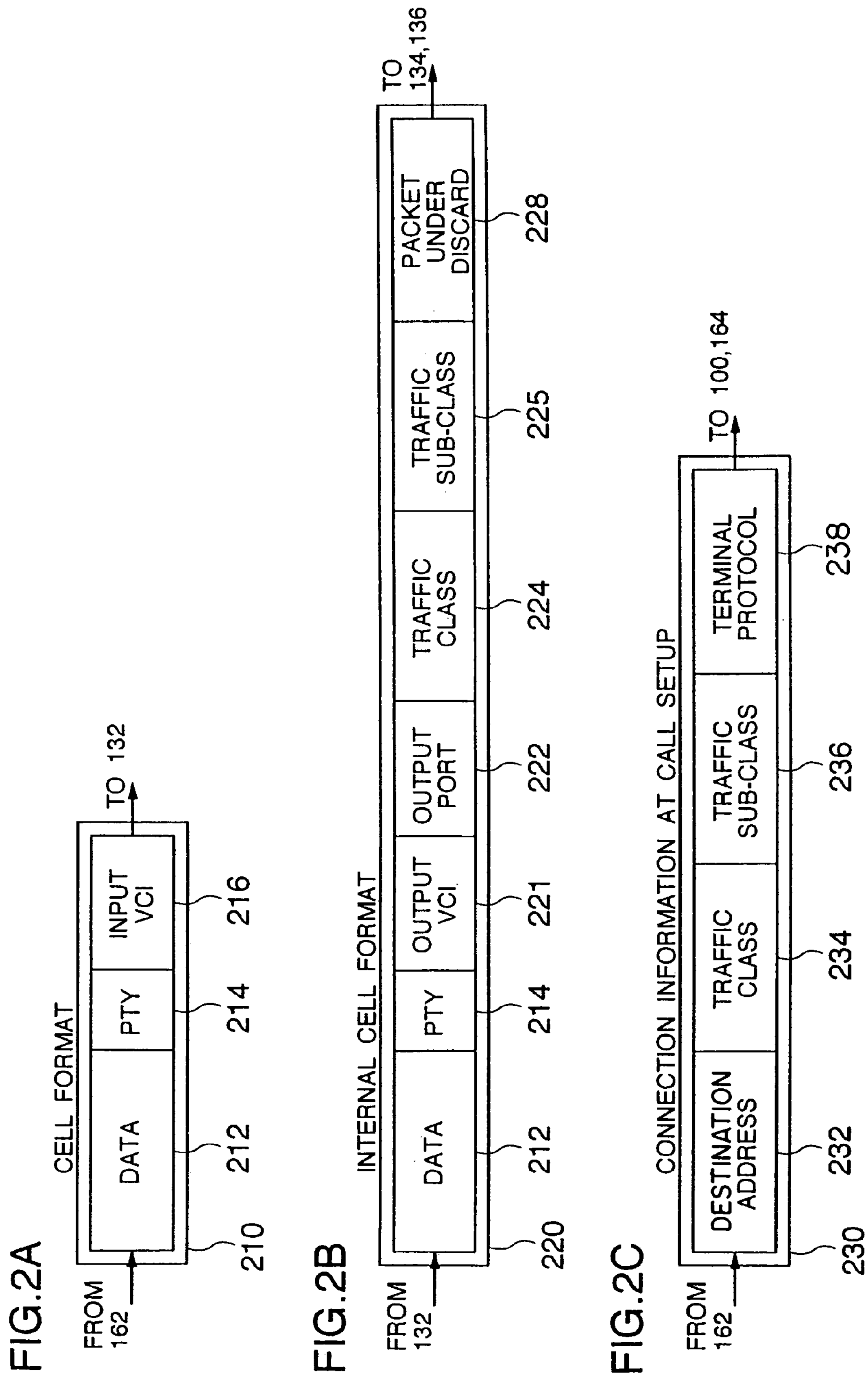
FIGS. 2A, 2B, 2C are diagrams illustrating formats of cells handled by the packet switching device 100 and a control message outputted from a terminal.

FIG. 2A illustrates a format of a cell 210 inputted from each input line to the input line interface unit 102 of the switch 100.

A message transmitted from the terminal A to the terminal B is divided into a plurality of data blocks having a fixed length, and a cell header is added to each data block to form the cell 210. Each cell 210 includes a header portion and a data portion 212, and the header portion includes an input VCI 216, and information (PTY) 214 indicating the position of a data block included in the data portion within a packet (transmission message) treated by a higher rank protocol. Assume in the following description that a cell including a data block at the head of an upper rank packet is referred to as a "packet delimiter".

The header conversion circuit 132, when an input cell 210 is inputted thereto from an input line, reads header conversion information corresponding to the input VCI 216 of the inputted cell 210 from a header conversion table to convert the header into an internal cell 220 in a format illustrated in FIG. 2B.

Added to a header portion of the internal cell 220 are an output VCI 221 for replacing the input VCI 216 of the input cell 210, routing information (output port information) 222, a traffic class 224, a sub-class 225, and a packet discard status information 228 indicating whether or not a packet associated with the VCI is discarded or not. Unless congestion occurs at an associated output port, the internal cell 220 is sent to the switch core unit 120 without being discarded, and driven into a particular output buffer FIFO 107 indicated by the routing information (output port information) through the crossbar switch circuit 105.

FIG. 2C illustrates a control message (connection information) 230 for setting up a call to be sent from the source terminal 162 to the switch 100 prior to a communication with the receiving terminal 164.

The connection information 230 includes destination address information 232 for specifying a destination terminal, traffic class information 234, sub-class information 236 for indicating a priority relative to cell discard, and terminal protocol information 238 indicative of an upper rank protocol at the source terminal. The connection information 230 is divided into a plurality of fixed-length blocks in the source terminal, and a cell header is added to each block to be formed into a control cell, having a similar format to that illustrated in FIG. 2A, which is then driven into the switch 100.

The control cell is transferred from the switch core unit 120 to the call control unit (connection processing unit: CP) 140 through a signal processing means, omitted in FIG. 1. The signal processing means is provided to assemble the contents (data block) of a data portion 212 of each control cell into the original connection information (message form) illustrated in FIG. 2C, and may be configured as part of the call control unit 140.

The call control unit 140 sets the output VCI 226 allocated to a call, output port information 222 specified by the destination address, and a traffic class 234 and a traffic sub-class 236 extracted from the connection information 230 to a conversion table (not shown) of the header conversion circuit 132 connected to the source terminal in a call setup sequence executed in response to the connection information.

When a call (connection) setup is completed between the terminals, the source terminal 162 starts sending cells (user cells) 210 to the destination terminal 164.

Figure 3:
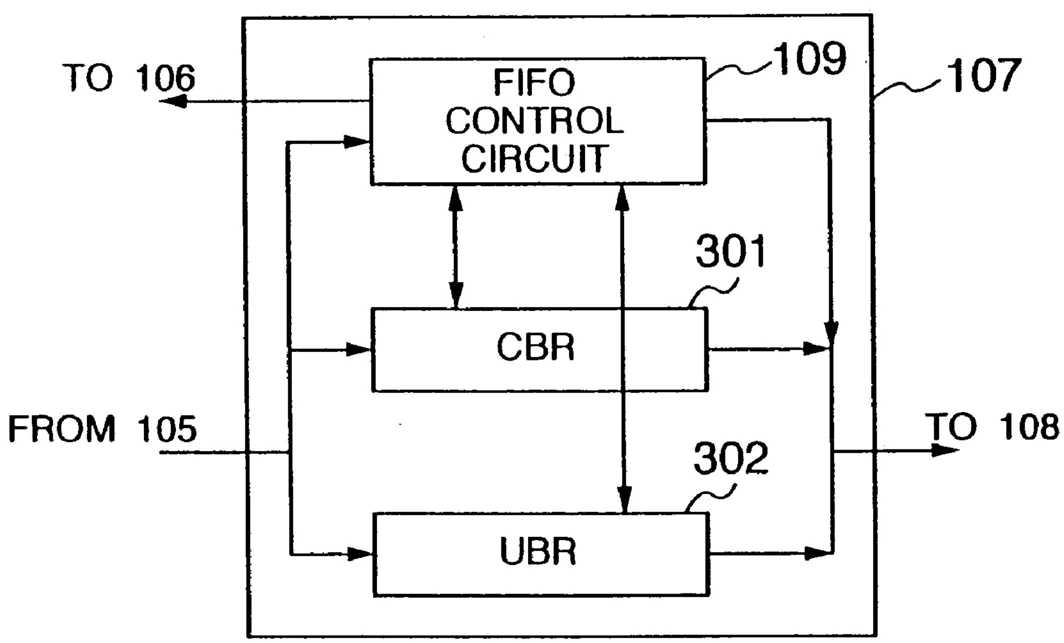
FIG. 3 is a block diagram illustrating an embodiment of an output buffer 107 in FIG. 1.

FIG. 3 illustrates an exemplary configuration of the FIFO output buffer 107.

The FIFO buffer 107 is composed of two FIFOs 301, 302, one for CBR and the other for UBR, and an FIFO control circuit 310. The FIFO control circuit 310 preferentially outputs cells accumulated in the CBR. FIFO 301 prior to cells accumulated in the UBR FIFO 302.

In a normal state in which no congestion occurs, user cells outputted from each FIFO output buffer 107*i* are inputted to an associated line output control unit LIFO 108*i* which discards unnecessary internal header information 222–228 and sends the user cell in the output cell format including information elements 212–221 onto an output line.

The cell accumulation status (congestion status) in each of two FIFOs 301, 302 for CBR and UBR traffic classes of each FIFO output buffer is collected in the congestion status measurement circuit 106 through a signal-line 156. The congestion status measurement circuit 106 edits the cell accumulation status into congestion status information corresponding to an output port, and notifies each of the input line interface units 102-1~102-N of the congestion status information through a signal line 152. For example, the congestion status measurement circuit 106 classifies the cell accumulation status at each output port into "no congestion", "light congestion", and "heavy congestion" and edits the cell accumulation status as the congestion status information.

Figure 4:
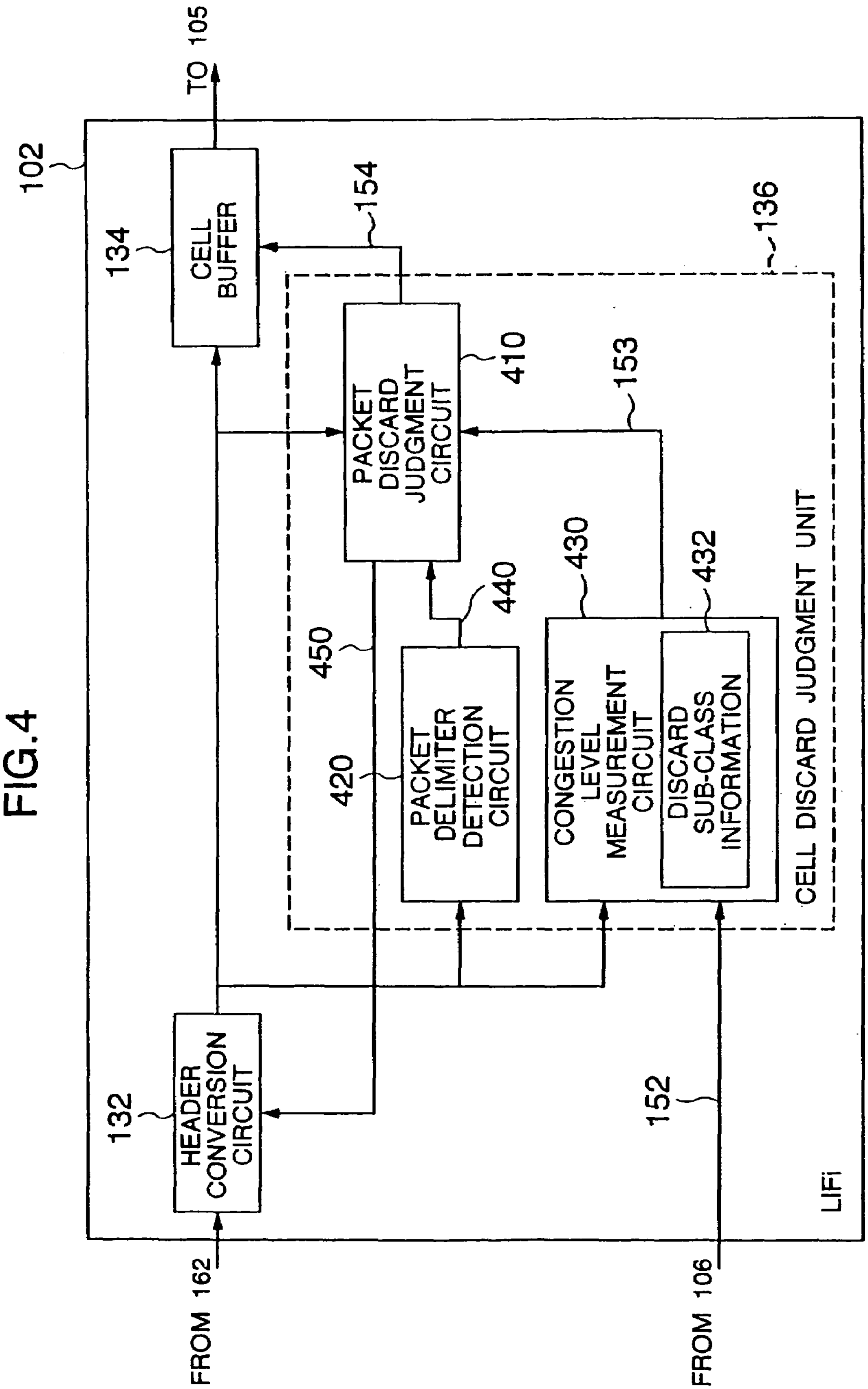
FIG. 4 is a block diagram illustrating an embodiment of an input line interface 102 unit in FIG. 1.

FIG. 4 illustrates in detail the configuration of the input line interface unit 102, particularly, the cell discard judgement unit 136. The cell discard judgement unit 136 comprises a packet discard judgement circuit 410, a packet delimiter detection circuit 420, and a congestion level judgement circuit 430.

The congestion level judgement circuit 430 fetches an output port 222, a traffic class 224, and a traffic sub-class 225 from among information elements of each input cell converted into an internal cell format by the header conversion circuit 132, judges whether or not discard of the input cell is necessary based on the fetched information and congestion status information 152 provided from the congestion status measurement circuit 106, and provides the packet discard judgement circuit 410 with a discard control signal 153 in accordance with the judgement result. The congestion level judgement circuit 430 utilizes discard sub-class information 432, which is counted up or down in accordance with the congestion status information 152, to determine a mode for the discard control signal 153.

For example, when the traffic class 224 of an input cell is a best effort traffic class, the congestion level judgement circuit 430 pays attention to congestion status information 152' of a particular output port corresponding to the output port information 222 of the input cell within the congestion status information provided from the congestion status measurement circuit 106, and counts down the discard sub-class information 432 corresponding to the particular output port when the congestion control information 152' indicates "no congestion", maintains a current value of the discard sub-class information 432 when the congestion control information 152' indicates "light congestion", and counts up the discard sub-class information 432 when the congestion control information 152' indicates "heavy congestion". Next, the congestion level judgement circuit 430 compares the value of a cell discard priority indicated by the traffic sub-class 225 of the input cell with the discard sub-class information 432, and sets the discard control signal 153 in a "pass mode" when the priority is larger than the value of the discard sub-class information 432, in a "packet unit discard mode" when equal, and in a "all cell discard mode" when smaller.

The packet delimiter detection circuit 420 judges PTY 214 of an input cell in the internal cell format outputted from the header conversion circuit 132, and turns on a signal 440 indicative of a delimiter of a packet when the input cell includes a head block of the packet in a data portion 212. The signal 440 is provided to the packet discard judgement circuit 410.

The packet discard judgement circuit 410 judges whether or not the input cell should be discarded based on the discard control signal 153, the packet delimiter signal 440, and the packet discard status information 228 extracted from the input cell in the internal cell format outputted from the header conversion circuit 132, and generates a cell discard instruction signal 154 as described in detail in the following (a)–(d). The cell buffer (packet discard means) 134 selectively passes or discards the input cell in accordance with the cell discard instruction signal 154.

(a) When the packet discard status information 228 included in the header portion of an input cell indicates "packet under discard", the cell discard instruction signal 154 is turned on irrespective of the status of the cell discard control signal 153. With the cell discard instruction signal 154 turned on, subsequent input cells including data blocks of the same packet are sequentially discarded.

(b) When the cell discard control signal is in the "pass mode", the cell discard instruction signal 154 is turned off except for the case where an input cell falls under the condition (a). In this case, input cells are written into the buffer 134 and then supplied to the switch core unit 120.

(c) When the cell discard control signal 153 is in the "packet discard mode", the cell discard instruction signal 154 is turned on at the time the packet delimiter signal 440 is turned on. For a packet, the data block of which has partially passed, subsequent cells are not subjected to the discard processing. At the time the cell discard instruction signal 154 is turned on, the header conversion circuit 132 is provided with a header conversion table rewrite instruction 450 to set the packet discard status information 228 in the cell header in "packet under discard", such that all of subsequent cells including data blocks of the same packet are discarded under the condition (a).

(d) When the cell discard control signal 153 is in the "all cell discard mode", the cell discard instruction signal 154 is tuned on, and an instruction 440 is issued to the header conversion circuit 132 to rewrite the header conversion table to change the packet discard status information 228 to "packet under discard". In this way, input cells are sequentially discarded until the cell discard control signal 153 is changed to another mode.

While an embodiment of the present invention has been described in connection with a UBR traffic class taken as an example, the present invention can be likewise applied to other traffic classes in the best effort control traffic class group, for example, an ABR traffic class. Also, the sub-class information is not particularly limited in terms of information format or the like as long as it is information having unified interpretation shared among a source, switch, destination, and so on.

While a cell switch having an N (input)×N (output) configuration has been described as an example in the foregoing embodiment, the cell transfer control of the present invention is also applicable to a multiplexer having a N-input×one-output configuration, a speed conversion buffer having a one-input×one-output configuration, and so on.

Also, while in the embodiment, the packet discard mode has been implemented by an operation mode which recognizes a delimiter of a packet from a cell header, passes subsequent cells of a packet, the cells of which have partially passed, and starts the discard processing from the head cell of a newly arriving packet, the packet discard mode may be modified to immediately start discarding cells at the time congestion has occurred, and pass cells of a new packet and discard subsequent cells of a packet, the cells of which have been partially discarded, when the congestion is solved. Further, these packet discard modes may be switched in accordance with a congestion status.

As is apparent from the foregoing embodiment, according to the present invention, a cell discard priority is declared as sub-class information in a traffic class, upon setting up a call, and stored in a node such as an ATM switch and so on, for a best effort control traffic class group which has difficulties in making bandwidth reservation from a terminal unit upon setting up a call. With the cell discard priority, when congestion occurs in a node, cells of connections with lower priorities are preferentially discarded, thereby making it possible to protect traffics of connections with higher priorities.

What is claimed is:

1. A packet transfer control method on a packet switching device, said method comprising the steps of:

sending a control packet including a traffic class indicative of a packet transfer priority and information indicative of a priority related to packet discarding from a source unit;

storing said information indicative of the priority related to packet discarding; and performing selective discard processing on user packets belonging to said particular traffic class in conformity with a predetermined discard condition based on priority indicated by said information indicative of the priority related to packet discarding, wherein the selective discard processing is continued on subsequent packets included in part of a same message as data portions of already discarded packets, even if the subsequent packets deviate from the predetermined discard condition due to a change in congestion status.

2. A packet transfer control method according to claim 1, wherein said packet switching device excludes user packets including data blocks of the same transmission message as data portions of previously sent user packets from user packets to be discarded, and starts the discard processing from a user packet including a data block of a subsequent new message.

3. A packet switching device for transferring packets, comprising:

means for extracting a traffic class indicative of a packet transfer priority and information indicating a priority related to packet discarding from a control packet sent from a source unit;

means for storing said information indicating the priority related to packet discarding; and means for selectively performing discard processing on an user packet belonging to said particular traffic class in conformity with a predetermined discard condition based on priority indicated by said information indicating the priority related to packet discarding, wherein the selective discard processing is continued on subsequent packets included in part of a same message as data portions of already discarded packets, even if the subsequent packets deviate form the predetermined discard condition due to a change in congestion status.

4. A packet processing device for processing a packet, comprising:

means for extracting traffic class information and sub-class information indicative of a packet transfer priority and information indicating a priority related to packet discarding from a control packet sent from a source unit;

means for storing said traffic class information and said sub-class information extracted from said control packet; and packet discard control means operative to selectively discard user packets by specifying user packets to be discarded based on the priority related to packet discard indicated by said sub-class information, wherein user packets are selectively discarded in accordance with said sub-class information to which each user packet belongs, even if the user packets belong to the same traffic class, wherein each user packet includes a data block and a header portion which includes delimiter information which indicates a correspondence of said user packet to a data unit of a transmission message, wherein said packet discard control means specifies user packets to be discarded in data units of the transmission message based on the delimiter information in each user packet, and wherein the discard control means continues to selectively discard subsequent packets included in part of the same message as data portions of already discarded packets, even if the subsequent packets deviate from a predetermined discard condition due to a change in congestion status.

* * * * *